United States Patent [19]

Lisec

[11] Patent Number: 4,769,105

[45] Date of Patent: Sep. 6, 1988

[54] DEVICE FOR THE MOUNTING OF FLEXIBLE SPACERS

[76] Inventor: Peter Lisec, Bahnhofstr. 34, A-3363 Amstetten-Hausmening, Austria

[21] Appl. No.: 92,411

[22] Filed: Sep. 1, 1987

[30] Foreign Application Priority Data

Sep. 1, 1986 [AT] Austria ................................ 2358/86

[51] Int. Cl.[4] .............................................. B29C 47/92

[52] U.S. Cl. .................................... 156/468; 156/107; 156/109; 156/486; 156/522; 156/523; 156/574; 156/576; 156/381

[58] Field of Search ................. 156/107, 109, 99, 350, 156/361, 574–577, 522–523, 543, 468, 486

[56] References Cited

U.S. PATENT DOCUMENTS

| | | | |
|---|---|---|---|
| 3,427,776 | 2/1969 | Lake et al. . | |
| 4,285,752 | 8/1981 | Higgins | 156/350 X |
| 4,328,061 | 5/1982 | Off et al. | 156/574 X |
| 4,356,614 | 11/1982 | Kauferle et al. | 156/109 X |
| 4,477,304 | 10/1984 | Westermann | 156/575 X |
| 4,561,929 | 12/1985 | Lenhardt | 156/109 X |
| 4,693,778 | 9/1987 | Swiggett | 156/574 X |
| 4,708,762 | 11/1987 | Lenhardt | 156/109 X |
| 4,714,425 | 12/1987 | Lenhardt | 156/109 X |

FOREIGN PATENT DOCUMENTS

| | | |
|---|---|---|
| 326295 | 12/1975 | Austria . |
| 0152807 | 8/1985 | European Pat. Off. . |
| 0171309 | 2/1986 | European Pat. Off. . |
| 2525846 | 12/1976 | Fed. Rep. of Germany . |
| 3002904 | 8/1980 | Fed. Rep. of Germany . |

*Primary Examiner*—David Simmons

*Attorney, Agent, or Firm*—Young & Thompson

[57] ABSTRACT

A device for mounting flexible spacers (2) to a glass pane (3) during the course of manufacturing insulating glass comprises a tool (20) for attaching the spacer (2), this tool being movable relatively to the glass pane (3). The tool (20) is guided to be displaceable upwards and downwards by way of a slide (21) and is rotatable about an axis oriented essentially perpendicularly to the glass pane (3) and is reciprocatable in the direction of this axis. The spacer (2) is guided, through a shaft (23) of hollow design pertaining to the tool (20), to an attaching head (22) of the tool. The tool (20) and the supply station (70) are accommodated in a temperature-controlled housing (71).

39 Claims, 6 Drawing Sheets

DEVICE FOR THE MOUNTING OF FLEXIBLE SPACERS

The invention relates to a device for the mounting of prefabricated flexible spacers to a glass pane during the course of the manufacture of insulating glass, with a lateral support for substantially vertically disposed glass panes, a conveying means for feeding the glass panes, and with a tool for attaching the spacer, this tool being movable relatively to the glass pane, wherein the tool is displaceable upwards and downwards by way of a slide on a substantially vertically disposed guide rail, and with a supply station for the spacer exhibiting a feed reel for the spacer.

Such devices have been known from European Laid-Open Applications Nos. 0 152 807 and 0 171 309; in the last-mentioned application, the spacer is molded, at the instant of mounting, from a plastic, rubbery mass (butyl rubber).

Spacers for insulating glass that can be mounted with the aid of the device according to this invention have been described, for example, in DOS No. 3,002,904 or in U.S. Pat. No. 3,427,776, and are also called "swiggle strip".

The device known from European Laid-Open Application No. 0 152 807 comprises a substantially fixedly arranged unit for pressing the spacer onto a glass pane that is traveling through; in this procedure, the glass pane must be turned by 90° as soon as the unit for pressing the spacer in place has arrived at a corner.

In the device according to European Laid-Open Application No. 0 171 309, an injection head with which the rubbery, plastic composition is molded into a strip applied to the glass pane is moved vertically upwards and downwards so that, by combined movements of the injection head and of the glass pane, synthetic resin skeins that extend all around can be applied by molding.

The invention is based on the object of providing a device of the type discussed hereinabove which makes it possible to apply prefabricated, flexible spacers to a glass pane without any problems, the turning of the glass pane by 90° being avoided and yet it being possible to mount a prefabricated spacer as in European Laid-Open Application No. 0 152 807.

The invention, in attaining this object, is characterized in that the tool is rotatable at the slide about an axis oriented essentially perpendicularly to the lateral support for the glass panes, and can be moved forwards and backwards in the direction of this axis, the spacer being guided through a hollow-configured shaft of the tool to an attaching head of the latter.

Owing to the structure according to the invention, the pivoting of the glass pane to which the spacer is to be attached, constituting a disadvantageous feature in European Laid-Open Application No. 0 152 807, can be eliminated. Since moreover the spacer is fed through a hollow-designed shaft of the tool, no problems whatever are encountered during turning of the tool by 90° together with the attachment head provided at the tool in the region of a corner of the glass pane to which the spacer is to be attached.

The embodiments emphasized as inventive in claims 2–16 bring about an especially simple and unproblematic guidance of the spacer in the zone of the tool wherein additionally the driven conveyor belts advancing the spacer toward the glass pane, as known from European Laid-Open Application No. 0 152 807, can be omitted.

The movements of the tool and of the attaching head driven thereby are made especially simple if the device of the invention exhibits the features of claims 17–22.

The features emphasized as pertaining to the invention in dependent claims 23–30 result in an especially unproblematic feeding of the spacer, to be attached, to the tool and in a simple and yet effective regulation of the drive mechanism for the take-off reel.

In dependent claims 31–35, features of the invention are emphasized providing an especially favorable and safe arrangement for a particularly simple and reliable movement of the glass panes while they are being supplied and during the motions while the spacer is applied, which latter is pushed by the relative motion between the glass pane and the attaching head through the tool.

The embodiment of a device for applying flexible spacers to a glass pane as characterized in independent claims 39–42 ensures that the temperature range (about 10–15° C.) favorable for the processing of such spacers can be maintained independently of the surrounding temperature.

Additional features and details of the invention can be seen from the following description of the embodiments illustrated in the drawings, in part schematically. In the drawings.

Figure 1:
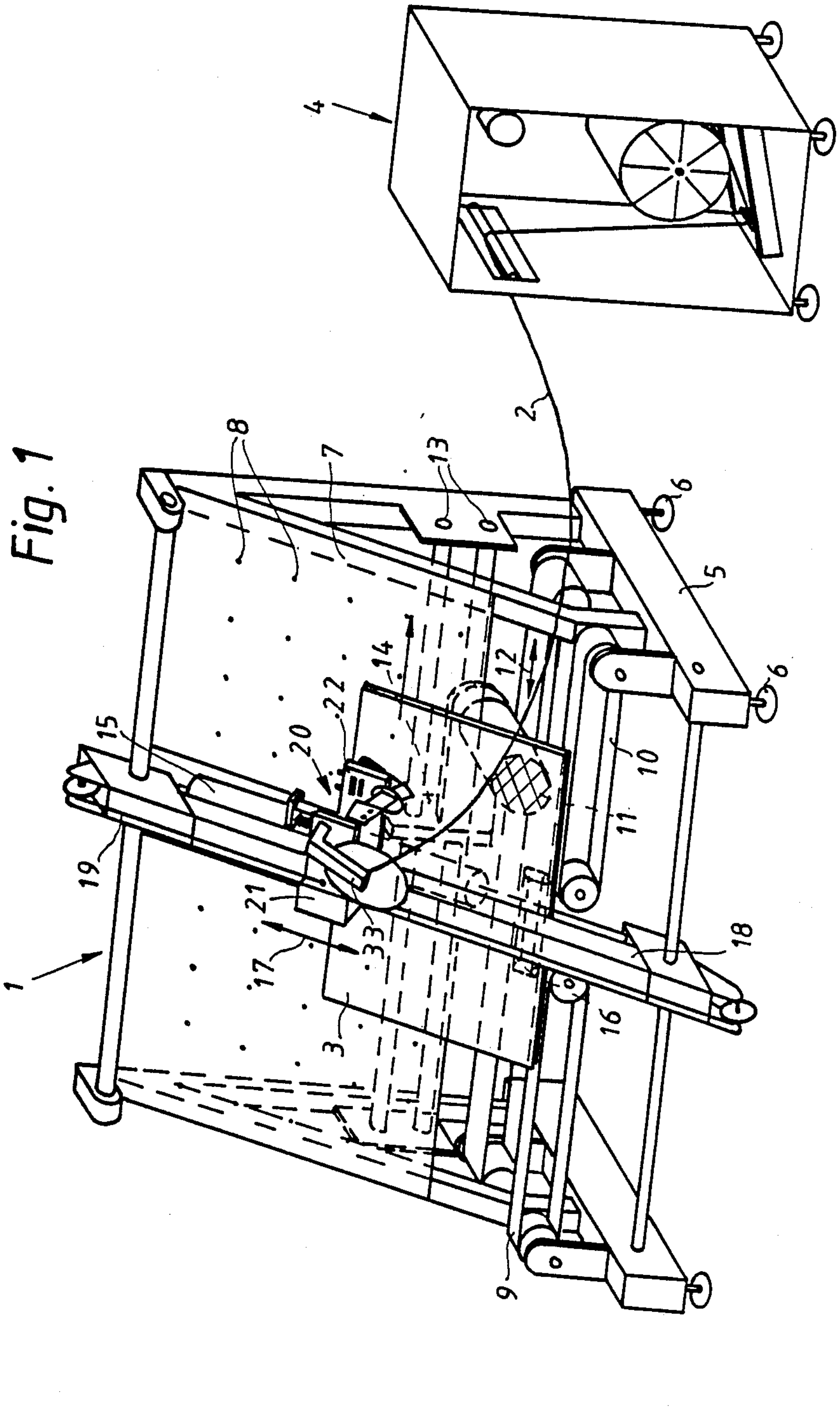
FIG. 1 shows, in a perspective view, the entire device.

The arrangement illustrated in FIG. 1 comprises the actual device 1 for mounting a spacer 2 to a glass pane 3 and a supply station 4 for the spacer 2, set up beside the device 1.

As can be seen from FIG. 1, the device 1 comprises a machine frame 5 resting on the floor by way of feet 6. The machine frame carries a support inclined rearwardly by a few degrees, for example 6°–8°, designed as a supporting wall 7; in the illustrated example, the supporting wall 7 is fashioned as an air cushion wall with outlet orifices 8 for compressed air.

A horizontal conveyor 9, 10 consisting cf two segments is provided at the lower end of the supporting wall 7. An entraining means 11, fashioned, for example, as a vacuum suction element, is provided between the lower rim of the supporting wall 1 and the horizontal conveyor 9, 10, the entraining means 11 being slidable to and fro on guides 13 by means of a drive mechanism, not illustrated in detail, for the to and fro movement of the glass pane 3 in the direction of the double arrow 12. The entraining means 11 and, respectively, its slide 14 guided along the guides 13 can advantageously be coupled with the horizontal conveyor 9, 10 to ensure an absolutely synchronous movement between the two conveyors.

A supporting roll 15 for the glass pane 3 is additionally provided in the supporting wall 7; this roll is rotatable about an axis extending in parallel to the supporting wall 7 and lying in a vertical plane. A drive mechanism can be associated with the supporting roll 15 for driving the latter, the peripheral velocity of the supporting roll 15 being equal to the linear velocity of horizontal conveyor 9, 10 and entraining means 11.

A conveyor belt 16 is furthermore arranged underneath the supporting roll 15, this belt being short and being drivable at a velocity corresponding to the horizontal conveyor 9, 10; the belt supports the lower, horizontal rim of the glass pane 3. The conveyor belt 16 is guided about two guide rollers, the axles of which extend in parallel to the plane of the supporting wall 7 and are aligned in vertical planes.

In front of the supporting wall 7, the device exhibits a tool 20 displaceable upwards and downwards in the direction of double arrow 17 on a guide rail 18 connected to the machine frame 5. A chain hoist 19 is provided, for example, for moving the tool 20 along the rail 18.

The tool 20 is guided on the guide rail 18 by way of a slide 21. The structure of the tool 20 can best be seen from FIGS. 2-4 and will now be described with reference to these figures.

The tool 20 comprises a shaft 23, designed to be hollow, this shaft being housed in a bearing bush 24 arranged at the slide 21. The hollow shaft 23 is displaceable with respect to the bearing bush in the direction of the axis of the hollow shaft 23 and is rotatable about this axis.

For the reciprocation of the hollow shaft 23 and thus of the processing tool 20 and its attaching head 22, a disk 25 is rigidly connected to the hollow shaft 23. From both sides, rollers 26 engage this disk 25, these rollers being attached to a push rod 27. The push rod 27 can be shifted with respect to the slide 21 in a direction in parallel to the axis of the hollow shaft 23 by means of a pressure medium motor, not shown. During this process, the tool 20 is likewise shifted.

For rotating the tool 20 about the axis of the hollow shaft 23, a toothed disk 28 is connected with the hollow shaft 23 and is engaged by a pinion 30 coupled with a self-locking motor 29.

In order to pick up the respective rotational position of the hollow shaft 23 and thus of the attaching head 22 of the tool 20, an incremental transmitter 31 is provided driven by way of a gear mechanism 32 and detecting the rotational position of the tool 20 and transmitting this position, inter alia, to the drive motor 29.

The spacer 2 arrives from the supply station 4 at the tool 20 in the form of a freely downwardly sagging loop and, at the tool, is guided at the inlet end of the hollow shaft 23 by means of four guide rollers and guided into the interior of the hollow shaft 23. The four guide rollers are arranged on a cantilever arm 33 connected to the slide 21. In this arrangement, two guide rollers 34 and 35 are freely rotatable about axes in parallel to the axis of the hollow shaft 23, and two further rollers 36, 37 are arranged to be freely rotatable about axes perpendicular to the axis of the hollow shaft 23 (compare FIG. 4). The rollers 34, 35 serve for the vertical guidance of the spacer 2 whereas the roller 36 serves as a rerouting roller, and the roller 37 is provided as a retaining roller.

After passing through the quill shaft 23, the spacer 2 passes (compare FIG. 3) to a roller triplet 38. By means of the roller triplet 38, the spacer 2 is slightly deflected from its travel direction initially congruent with the axis of the hollow shaft 23. For this purpose, the roller triplet 38 comprises a rerouting roller (not visible in FIGS. 2 and 3) freely rotatable transversely to the axis of the hollow shaft 23, and two lateral guide rollers 39. The roller triplet 38 is rigidly joined to the tool 20, i.e. rotates therewith, in contrast to the roller quadruplet provided on the inlet side of the hollow shaft 23 and consisting of rollers 34–37.

After the spacer 2 has passed through the roller triplet 38, it travels through a guide ring 40 rigidly connected to the attaching head 22 of the tool 20, particularly to the plate 22′ thereof. Downstream of the guide ring 40, the spacer 2 arrives at an additional rerouting roller 41 by which the spacer is guided into a direction in parallel to the supporting wall 7. After having been rerouted by a further rerouting roller 42, the spacer 2 passes on to a contact roller 43 freely rotatable at the plate 22′ of the attaching head 22 about an axle 44 in parallel to the supporting wall 7. The position of the axle 44 of the contact roller 43 can be adjusted by means not illustrated in detail.

Following the contact roller 43, two guide rollers 45, 46 are additionally provided which contact the spacer 2 from both sides.

As seen in the travel direction of the spacer 2 (arrow 47 in FIG. 3), a clamping tool 48 with two jaws 49, 50 is furthermore provided downstream of the guide rollers 45, 46. In this arrangement, the jaw 49 is fixedly joined to the attaching head 22 whereas the jaw 50 is movable with respect to the fixed jaw 49 and is pulled away from the fixed jaw 49 by means of a spring 51. With the aid of a pressure medium motor 52, the jaw 50 can be swung toward the jaw 49, clamping the spacer 2 in the clamping tool 48. The clamping jaws 49 and 50 of the clamping device 48 are aligned so that their side facing the guide rollers 45, 46, i.e. the side on which the spacer 2 laterally exits from the clamping tool, lies exactly in a plane passing through the axis of rotation of the hollow shaft 23. Moreover, the spacer 2 is at that location oriented in symmetry to the axis of the hollow shaft 23.

Figure 2:
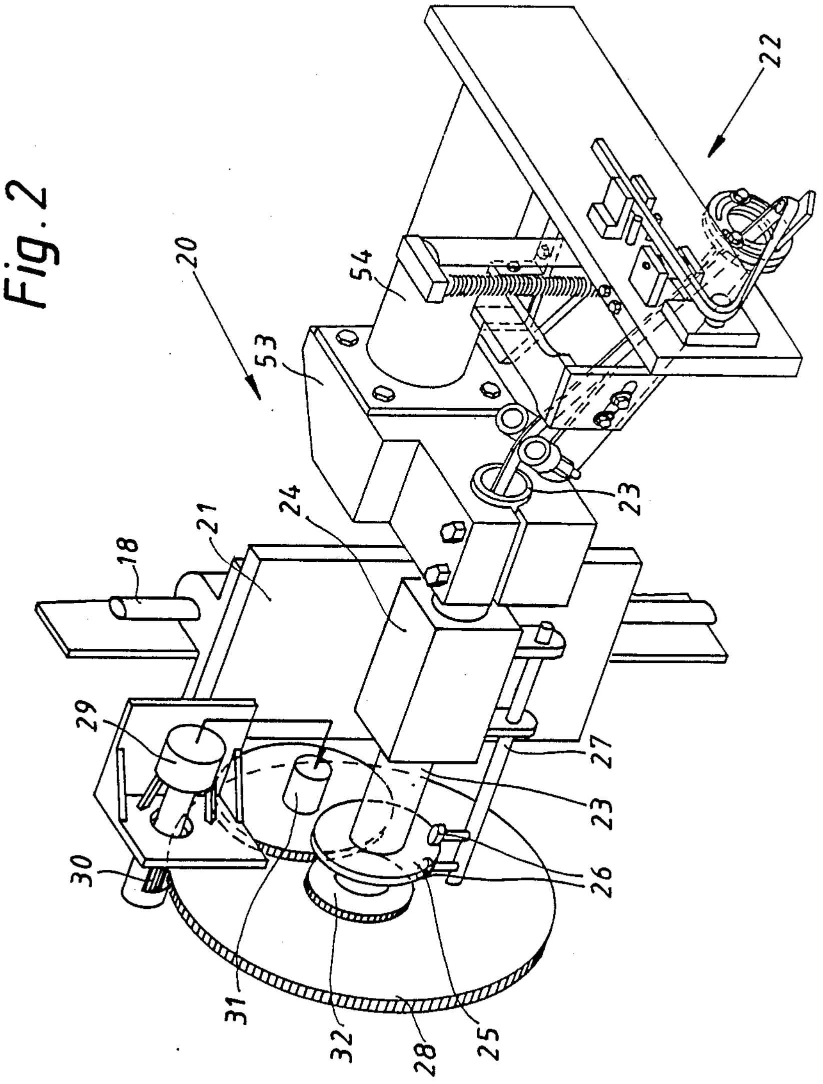
FIGS. 2, 3 and 4 show details of the tool with the attaching head.
Figure 3:
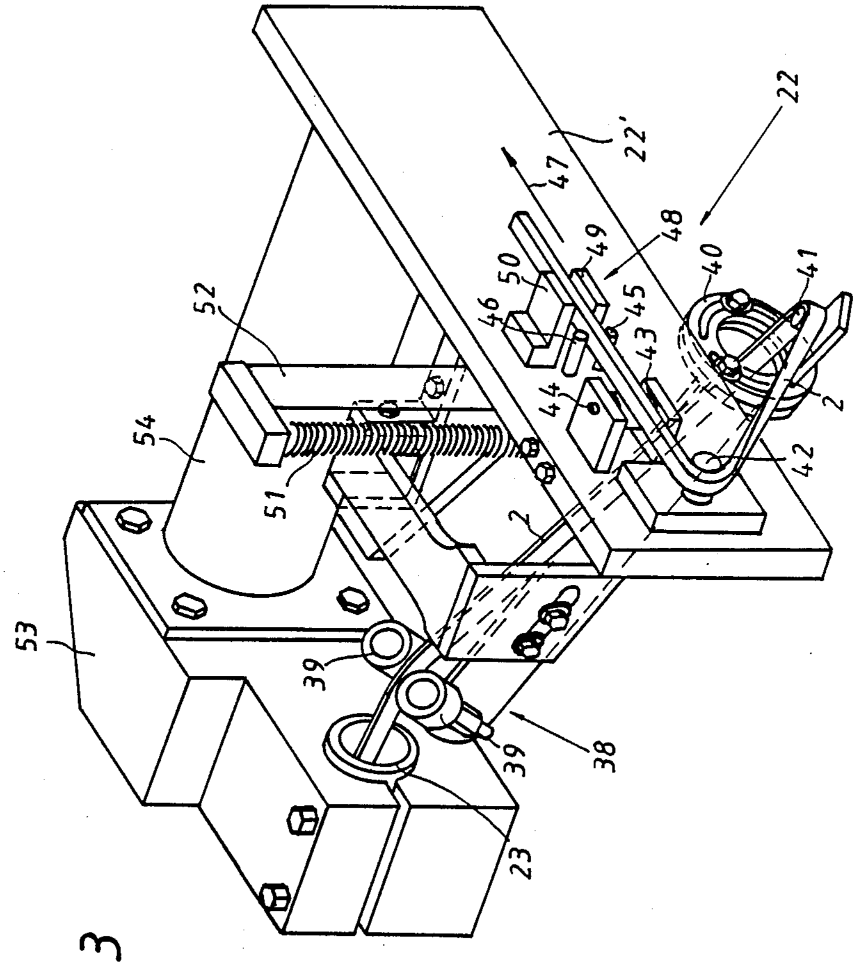
Figure 4:
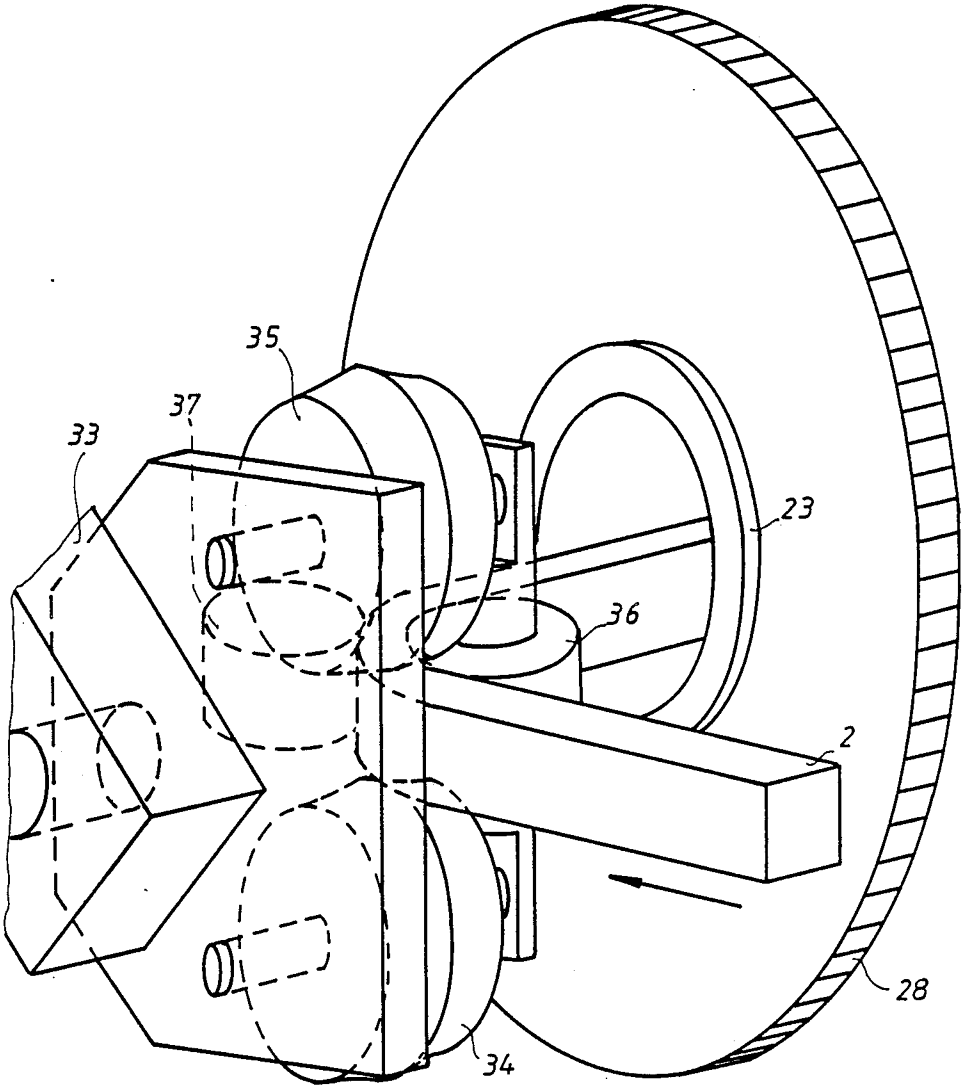

It can furthermore be seen from FIGS. 2 and 3 that the attaching tool 22 is connected to the hollow shaft 23 by way of a cranked arm consisting of parts 53 and 54.

Figure 5:
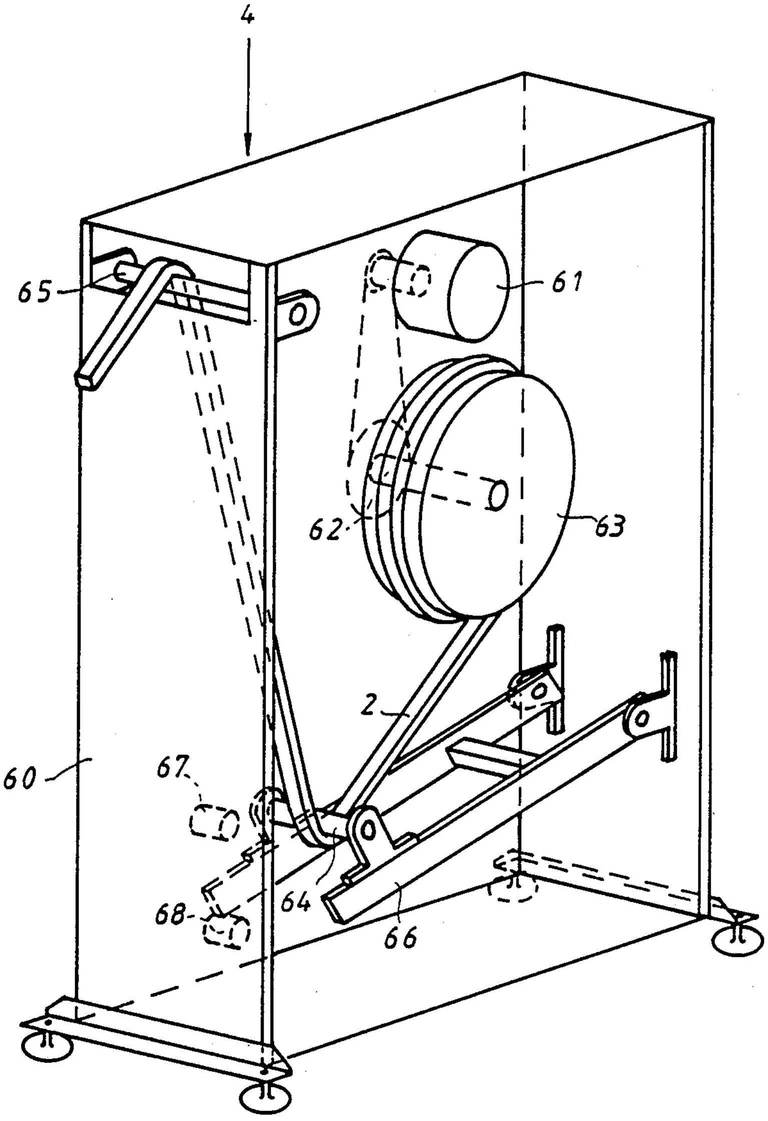
FIG. 5 shows the supply station.

The take-off station 4 shown in greater detail in FIG. 5 comprises a housing 60 wherein a mounting means 62, drivable by a motor 61, is provided for a feed reel 63 for the spacer 2. As can be seen from FIG. 5, the spacer 2 initially travels downwardly to a rerouting drum 64 and then upwardly to a further rerouting drum 65 whereupon it is guided to the tool 20, as can be derived from FIG. 1, freely sagging in the shape of a loop. The upper rerouting drum 65 is fixedly mounted in the housing 60 of the take-off station 4 whereas the rerouting drum 64 is supported on two levers 66 to be movable upwards and downwards. The respective position of rerouting drum 64 is detected by a top switch 67 and a bottom switch 68. In this arrangement, the switches 67 and 68 control the motor 61 in the following way: The motor 61 is shut off when the rerouting drum 64 or the levers 66 carrying same enter the zone of the switch 68, whereas the motor 61 is activated when the rerouting roller 64 and, respectively, the levers carrying same enter the zone of switch 67. The switches 67 and 68 can be light barriers (reflected-light barriers), for example.

It is also possible to arrange additional switches (not shown) between switches 67 and 68, these switches affecting the speed of revolution of the drive motor, i.e. raising or reducing such speed.

In order to avoid overstressing of the spacer 2 by the weight of the rerouting drum 64 and the levers 66, weight relief can be provided which can be designed in the form of a pressure medium motor or of at least one spring, stressing the levers 66 in the upward direction.

The device described with reference to FIGS. 1 through 5 operates as follows:

A flexible spacer is unreeled from the feed reel 63 located in the take-off station 4, the feed reel 63 being driven by the motor 61, controlled by means of the switches 67, 68. A protective strip that may be present on the spacer 2 is pulled off and removed.

The spacer 2 travels about the rerouting drums 64 and 65 and then to the tool 20 of the device 1; during this process, the spacer is deflected by the rerouting roller 36 into the axis of the hollow shaft 23 and is guided by the guide rollers 34, 35 laterally and by the fourth roller 37 from the outside.

After passing through the hollow shaft 23, the spacer 2 arrives at the roller triplet 38 where it is deflected, by the rerouting roller, not shown, from the direction of the axis of the hollow shaft 23 and, during this step, is guided laterally by the rollers 39.

At this point in time (or previously) a glass pane 3 is (was) guided into the device with the aid of the horizontal conveyor 9, 10, the arrangement in the illustrated embodiment being such that the glass pane 3 is fed from the left-hand side of FIG. 1. During this process, the supporting wall 7 is under the effect of compressed air exiting through the openings 8 provided in this wall so that an air cushion is formed between the glass pane 3 and the supporting wall 7. As soon as the glass pane reaches, with its forward, vertical edge, a position wherein it lies in opposition to the axis of the hollow shaft 23, the pane is arrested and the entraining means 11 which, for example, can exhibit a suction cup, is applied from the rear to the glass pane 3 so that the latter is held in place. Additionally, or as an alternative, the supporting wall 7 can be exposed to a vacuum so that the glass pane 3 is sucked against the supporting wall 7. During this step, the glass pane 3 is rearwardly supported in the zone of its forward, vertical edge additionally by the substantially vertically aligned supporting roll 15 which revolves during feeding of the glass pane 3 in correspondence with the conveying speed. For this purpose, the supporting roll 15 projects slightly beyond the plane of the supporting wall 7.

At this point in time, the tool 20 is advanced toward the glass pane 3 by actuating the rollers 26 on the push rod 27 until the spacer 2 is urged by the contact roller 43 against the glass pane 3. The tool 20—more accurately expressed, the outlet side of the clamping tool 48 and thus the axis of rotation of the hollow shaft 23—is located during this step in the zone of the forward, lower corner of the glass pane 3, and the attaching head 22 of the tool 20 has been turned by operating the motor 29 so that the section of the spacer 2 present between the rerouting roller 42 and the clamping tool 48 is aligned vertically, i.e. is parallel to the forward, vertical rim of the glass pane, and the contact roller 43 lies above the clamping tool 48.

Thereafter the tool 20 is moved upwards by moving the slide 21, the spacer 2 being pressed against the glass pane 3 and carried along without additional drive means.

As soon as the tool 20 has arrived in the zone of the upper, forward corner of the glass pane 3, the applicator head 22, after the clamps 49 and 50 have gripped the spacer 2 by operating the pressure medium cylinder 52, is swung by 90° so that the spacer now extends horizontally between the clamping tool 48 and the rerouting roller 42.

Now—after, if desired, the vacuum has been lifted at the supporting wall 7—the horizontal conveyor 9 and the entraining means 11 are set into operation so that the glass pane 3 is moved along the tool 20, the upper, horizontal section of the spacer being applied to the glass pane 3.

By a renewed pivoting of the tool 20 by 90° in the region of the rearward, upper corner, the rearward, vertical edge is provided with a spacer, similarly as in the application of the spacer 2 in the zone of the forward, vertical edge of the glass 3, the tool 20 moving downwards with the contact roller 43 leading.

For attaching the spacer 2 in the zone of the lower, horizontal rim, the glass pane 3 is moved backwards, as described above, against the conveying direction so that finally all four rims of the glass pane 3 have been equipped with the spacer 2.

During mounting of the spacer 2 to the glass pane 3, the pressure exerted by the contact roller 43 of the attaching head 22 is absorbed by the supporting roll 15 and the short conveyor belt 16 so that there is no danger whatever of breakage.

After, in this way, spacer 2 has been applied to all four rims of the glass pane 3, the spacer is cut off by a cutting tool, not shown in detail, and the glass pane 3, after the tool 20 has been moved back with the aid of rollers 26, is moved out of the device to continue its travel, for example, to an assembly station for insulating glass.

It can be seen that, for moving the spacer 2 to the tool 20 and through the latter, no dditional drive mechanisms are necessary except for the drive means for the supply reel 63 since the spacer 2 is taken off at exactly the required speed by the combined movements of the tool 20 and of the glass pane 3.

On account of the clamping tool 48 and the two guide rollers 45, 46, sharp and exactly oriented corners are produced in the spacer 2 in the zone of the corners of the glass pane 3.

In accordance with an embodiment that has not been illustrated, it is possible to design the guide rail 18 to be horizontally displaceable so that, during mounting of the horizontal sections of the spacer 2 to the glass pane 3, the latter need not be moved itself. Also, an embodiment is possible wherein the glass pane 3 as well as the guide rail 18 are being moved.

Since the flexible spacers ("swiggle strips") attachable by means of the device of this invention, on the one hand, become very tacky at relatively high temperatures, as they can readily occur in factory hangars and, on the other hand, cannot be processed at temperatures that are too low, it is recommended to temperature-control the take-off and guide means for the spacer 2 in the device for attaching the spacer to a glass pane.

Figure 6B:
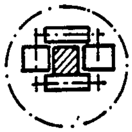
FIG. 6B is a fragmentary view taken in the direction of the arrow X in FIG. 6A.
Figure 6A:
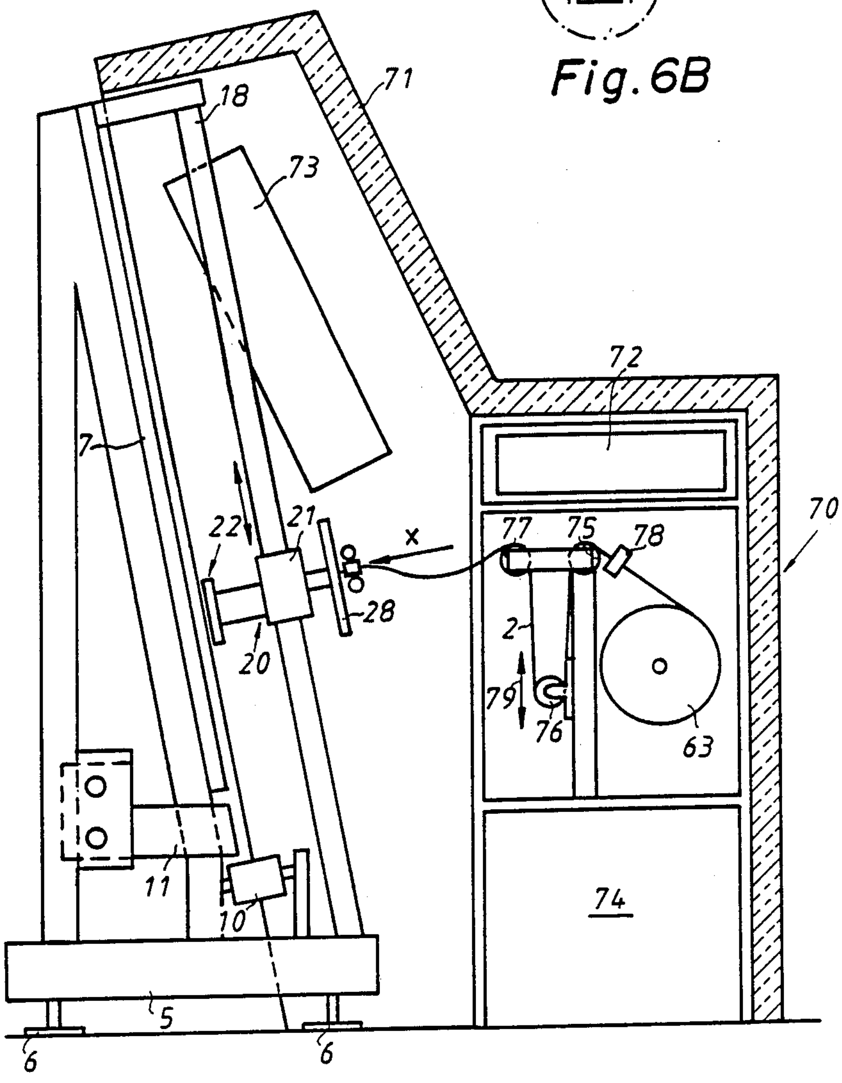
FIG. 6A shows an embodiment with a thermally insulating housing.

For this purpose, in the embodiment shown in FIGS. 6A and 6B for the device of this invention, the supply station 70, differently from the example illustrated in FIG. 1, is located directly in front of the guide rail 18 which latter is designed in this embodiment so that it cannot be pushed to and fro horizontally. The take-off means 70 for the spacer 2 and the guide rail 18 with the tool 20 are covered by an insulating housing 71 extending down to the floor and laterally into the immediate vicinity in front of the supporting wall 7. In the insulating housing 71, heating and cooling surfaces 72, 73 are respectively provided above the storage reel 63 for spacer 2 and in the section extended upwardly around the guide rail; a compressor can be accommodated, for example, in the space 74 underneath the supply reel 63.

The supply station 70, in the embodiment shown in FIG. 6A, is equipped with three rollers 75, 76, 77 which guide the spacer 2 with the formation of a downwardly guided loop in freely hanging condition to the tool 20. Two lateral guide rollers 78 for the spacer 2 are additionally associated with the rerouting roller 75 of the supply station 70. The lower rerouting roller 76 can be moved upwards and downwards in the direction of the double arrow 79 and regulates, as described for the supply station 4, the drive means for the supply reel 63.

It is understood that the supply station 70 can be used selectively in the device illustrated in FIG. 1, and the supply station 4 can be utilized by choice in the embodiment of the device according to this invention shown in FIG. 6A.

The idea of encompassing the supply station and the part of the device wherein the flexible spacer travels with a heatable and coolable insulating housing 71 has the advantage that the spacer 2 is correctly temperature-controlled and does not stick to its various guide rollers whereas the glass pane 3 arrives at the device with normal room temperature so that the spacer 2 will firmly adhere thereto when attached by the tool 20.

The housing 71 illustrated in FIG. 6A is also usable with advantage in devices for attaching flexible spacers to glass panes having a different construction than the herein-described embodiments of the device of this invention.

FIG. 6B furthermore illustrates that four rollers are arranged on the side of the hollow shaft 23 facing the supply station. These rollers, equipped with a no-stick coating (e.g. silicone), which are preferably driven, are intended for imparting to the spacer to be attached an exactly rectangular cross section while the spacer enters the attaching tool 20. For this purpose, the axes of these rollers are preferably located in one plane, and the rollers contact the spacer from all four sides.

I claim:

1. Device for mounting prefabricated flexible spacers to a glass pane during the course of the manufacture of insulating glass, with a lateral support for substantially vertically disposed glass panes, a conveying means for feeding the glass panes, and with a guide tool for attaching the spacer, this tool being movable relatively to the glass pane, wherein the tool is displaceable upwards and downwards by way of a slide on a substantially vertically disposed guide rail, and with a supply station for the spacer exhibiting a feed reel for the spacer, characterized in that the tool (20) is rotatable at the slide (21) about an axis oriented essentially perpendicularly to the lateral support (7) for the glass pane (3) and can be moved forwards and backwards in the direction of this axis, wherein the spacer (2) is guided through a hollow-designed shaft (23) of the tool (20) to an attaching head (22) of the latter.

2. Device according to claim 1, characterized in that, for guiding the spacer (2) in the tool (20) and in the attaching head (22) of the latter, there are provided several guide and, respectively, rerouting rollers (34–37, 38, 39, 41, 42, 45, 46) which are optionally combined into groups and are preferably freely rotatable.

3. Device according to claim 1, characterized in that the spacer (2) exits from the hollow shaft (23) of the tool upstream of the attaching head (22) and is deflected, with repeated rerouting, into a direction in parallel to the support (7).

4. Device according to claim 1, characterized in that the attaching head (22) exhibits at least one contact roller (43) for the spacer (2), rotatable about an axis in parallel to the support (7).

5. Device according to claim 4, characterized in that a roller pair (45, 46) is provided following the contact roller (43), the rollers (45, 46) being freely rotatable about axes oriented perpendicularly to the support (7) and being in contact with the spacer (2) on both sides.

6. Device according to claim 5, characterized in that a clamping means (48) is provided following the roller pair (45, 46), the end of the clamping means in opposition to the roller pair (45, 46) lying in the axis of rotation (axis of the hollow shaft 23) of the tool (20) and its attaching head (22).

7. Device according to claim 6, characterized in that the clamping tool (48) can be closed by means of a drive mechanism (52), preferably a pressure medium motor, so that its two jaws (49, 50) contact the spacer (2) from both sides.

8. Device according to claim 7, characterized in that one jaw (49) of the clamping tool (48) is rigidly attached to the attaching head (22), and that the other jaw (50) of the clamping tool (48) is mounted to be pivotable and can be moved by the pressure medium motor (52) toward the rigid jaw (49), and that the movable jaw (50) is stressed by a tension spring (51) along the lines of a pivoting into its open position.

9. Device according to claim 1, characterized in that guide rollers, preferably a roller triplet (38), are provided for the spacer (2) at the end of the hollow shaft (23) facing the support (7), and that the roller triplet (38) is rigidly connected to the tool (20).

10. Device according to one of claim 1, characterized in that the roller group arranged at the end of the hollow shaft (23) of the tool (20) on the inlet side comprises four rollers (34–37) wherein two rollers (34, 35) are oriented to be freely rotatable in parallel to the axis of rotation of the tool (20), and two further rollers (36, 37) are oriented to be freely rotatable about axes essentially perpendicular thereto, one of these rollers serving as a rerouting roller (36).

11. Device according to claim 1, characterized in that the attaching head (22) is connected with the hollow shaft (23) of the tool (20) by way of a cranked mounting (53, 54).

12. Device according to claim 1, characterized in that the roller triplet (38) located at the end of the hollow shaft (23) of the tool (20) on the outlet side is provided in the interior of the elbow of the mounting (53, 54) for the attaching head (22) wherein the rollers of the roller triplet (38) are freely rotatable about axes essentially perpendicular to the axis of rotation of the tool (20), and that two of the rollers (39) are mounted to be rotatable about axes in parallel to each other and essentially perpendicular to the third roller.

13. Device according to claim 1, characterized in that a ring (40) is provided at the attaching head (22), the spacer (2) being guided through this ring, and that, following the ring (40), a rerouting roller (41) is provided deflecting the spacer (2) into a direction substantially in parallel to the support (7).

14. Device according to claim 13, characterized in that, following the rerouting roller (41) located downstream of the ring (40), a further rerouting roller (42) is provided, arranged in the proximity of the contact roller (43) for the spacer (2).

15. Device according to claim 14, characterized in that the axis of the rerouting roller (41) provided after the ring (40) is aligned in a plane in parallel to the support (7).

16. Device according to claim 15, characterized in that the axis of the rerouting roller (42) provided upstream of the contact roller (43) is oriented essentially perpendicularly to the plane of the lateral support (7), the spacer (2) being twisted in itself between the rerouting roller (42) provided in front of the contact roller (43) and the rerouting roller (41) arranged in front of the roller (42).

17. Device according to claim 1, characterized in that a disk (25) is connected with the hollow shaft (23) of the tool (20), freely rotatable rollers (26) being in contact with this disk on both sides, which rollers are coupled preferably by way of a push rod (27) to a pressure medium motor in such a manner that the tool (20) can be displaced forwards and backwards perpendicularly to the lateral support (7).

18. Device according to claim 17, characterized in that the slide (21) exhibits a bearing bush (24) wherein the hollow shaft (23) is accommodated to be freely rotatable and reciprocatable in the direction of its axis.

19. Device according to claim 1, characterized in that an incremental transmitter (31) is connected preferably indirectly with the hollow shaft (23) of the tool (20) for determining the rotational position of the tool (20) and of the attaching head (22).

20. Device according to claim 19, characterized in that the incremental transmitter (31) is connected by way of a gear mechanism (32) to the hollow shaft (23) of the tool (20).

21. Device according to claim 1, characterized in that a self-locking motor is provided for turning the tool (20) and thus the attaching head (22).

22. Device according to claim 21, characterized in that the motor (29) exhibits a pinion (30) meshing with a gear wheel (28) nonrotationally joined to the hollow shaft (23).

23. Device according to claim 1, characterized in that the mounting shaft (62) for a supply reel (63) for spacer (2) in the supply station (4) can be driven by means of a motor (61).

24. Device according to claim 23, characterized in that the motor (61) for the supply reel (63) is regulated in dependence on the movement of the spacer (2).

25. Device according to claim 23, wherein the spacer is taken off the supply reel in the downward direction, characterized in that the spacer (2) is guided to the tool (20) about a rerouting drum (64) movable upwards and downwards substantially in the vertical direction, and then again upwards and with a repeated deflection by way of a rerouting drum (65) and from the latter preferably in the form of a freely downwardly hanging loop.

26. Device according to claim 25, characterized in that the movable rerouting drum (64) for the spacer (2) is mounted to be freely rotatable on levers (66) pivotable in the supply station (4) about an essentially horizontal axis.

27. Device according to claim 26, characterized in that at least one spring and/or at least one pressure medium motor is associated with the levers (66) carrying the rerouting drum (64), such spring or motor stressing the rerouting drum (64) in the upward direction.

28. Device according to claim 25, characterized in that switches are associated with the rerouting drum (64) and/or the levers (66) carrying same, wherein, with the rerouting drum (64) having been pivoted downwards, the drive motor (61) for the supply reel (63) is arrested and, with the rerouting drum (64) having been pivoted upwards, the drive motor (61) is set into motion.

29. Device according to claim 28, characterized in that there are arranged, between the two switches (67, 68) designed, for example, as light barriers, especially as reflected-light barriers, additional switches, for example reflected-light barriers, preferably at least two additional switches, which regulate the rotational speed of the drive motor for the supply reel (63) wherein the upper one of the additional switches transmits the command for a more rapid revolution and the lower switch transmits the command for a slower revolution.

30. Device according to claim 1, characterized in that there is arranged, in the lateral support (7) which is designed, for example, as an air cushion wall, in opposition to the tool (20) a substantially vertically aligned supporting roll (15) for the glass pane (3), this roll being coupled with the drive means for the horizontal conveyor (9, 10) at the lower end of the lateral support (7).

31. Device according to claim 1, characterized in that the supporting roll (15) projects somewhat past the plane of the lateral support (7).

32. Device according to claim 30, characterized in that a conveyor belt drivable in synchronism with the horizontal conveyor (9, 10) is provided beneath the supporting roll (15), this conveyor belt being guided around rerouting rollers which are rotatable about axes extending essentially in parallel to the lateral support (7) and being perpendicularly oriented, and this conveyor belt being in contact with the rear side of the glass pane (3).

33. Device according to claim 1, characterized in that the supply station (70) is set up immediately in front of the guide rail (18) for the slide (21) of the tool (29), the spacer (2) being fed essentially perpendicularly to the supporting plane (7).

34. Device according to claim 1, characterized in that the rerouting drum, by means of which the spacer (2), guided downwardly in the supply station (70), is again deflected in the upward direction, is guided to be movable upwards and downwards along an essentially vertical guide rail.

35. Device according to claim 1, characterized in that, in case of a spacer (2) fed essentially perpendicularly to the supporting plane (7) from a supply station (70), a roller quadruplet is provided at the inlet side of the hollow shaft (23) with axes of rotation that are, in pairs, perpendicular to each other and lie in a plane perpendicular to the axis of the hollow shaft (23), wherein each of the rollers of the roller quadruplet is in contact with one of the faces of the spacer (2).

36. Device for the mounting of flexible spacers to a glass pane during the course of manufacturing insulating glass, according to claim 1, characterized in that a supply station (70) for the spacer (2), and the tool (20) for attaching the spacer (2) to a glass pane (3), are surrounded by a housing (71) with thermally insulating walls, and that the interior of the housing (71) can be selectively cooled and heated.

37. Device according to claim 36, characterized in that the lateral walls of the housing (71) extend down to the floor and into the direct vicinity in front of a supporting wall (7) of the device.

38. Device according to claim 36, characterized in that heating and cooling surfaces (72, 73) are provided in the zones of the insulating housing (71) accommodating the supply reel (63) of the supply station (70) and the tool (20) and its guide rail (18).

39. Device according to claim 37, characterized in that the compressor of the cooling unit is arranged in a space provided underneath the supply reel (63).

* * * * *